United States Patent
Fukuchi et al.

(10) Patent No.: US 10,301,416 B2
(45) Date of Patent: May 28, 2019

(54) POLYISOCYANATE COMPOSITION AND METHOD OF MANUFACTURING THE SAME, BLOCKED POLYISOCYANATE COMPOSITION AND METHOD OF MANUFACTURING THE SAME, RESIN COMPOSITION, CURABLE RESIN COMPOSITION AND HARDENED MATERIAL

(71) Applicant: ASAHI KASEI CHEMICALS CORPORATION, Tokyo (JP)

(72) Inventors: Takashi Fukuchi, Tokyo (JP); Masako Uchida, Tokyo (JP); Yuichi Miwa, Tokyo (JP)

(73) Assignee: ASAHI KASEI CHEMICALS CORPORATION, Tokyo (JP)

( * ) Notice: Subject to any disclaimer, the term of this patent is extended or adjusted under 35 U.S.C. 154(b) by 18 days.

(21) Appl. No.: 14/900,279

(22) PCT Filed: Jun. 24, 2014

(86) PCT No.: PCT/JP2014/066733
§ 371 (c)(1),
(2) Date: Dec. 21, 2015

(87) PCT Pub. No.: WO2014/208567
PCT Pub. Date: Dec. 31, 2014

(65) Prior Publication Data
US 2016/0369034 A1    Dec. 22, 2016

(30) Foreign Application Priority Data

Jun. 27, 2013   (JP) .................. 2013-134440

(51) Int. Cl.
| | | |
|---|---|---|
| C08G 18/02 | (2006.01) | |
| C08G 18/10 | (2006.01) | |
| C08G 18/44 | (2006.01) | |
| C08G 18/62 | (2006.01) | |
| C08G 18/78 | (2006.01) | |
| C08G 18/79 | (2006.01) | |
| C08G 18/80 | (2006.01) | |
| C09D 175/00 | (2006.01) | |
| C09D 175/06 | (2006.01) | |

(52) U.S. Cl.
CPC .......... *C08G 18/022* (2013.01); *C08G 18/10* (2013.01); *C08G 18/44* (2013.01); *C08G 18/6225* (2013.01); *C08G 18/7837* (2013.01); *C08G 18/792* (2013.01); *C08G 18/807* (2013.01); *C08G 18/808* (2013.01); *C08G 18/8077* (2013.01); *C09D 175/00* (2013.01); *C09D 175/06* (2013.01)

(58) Field of Classification Search
CPC .......... C08G 18/022; C08G 18/7837; C08G 18/792; C08G 18/44; C08G 18/10; C08G 18/6225; C08G 18/807; C08G 18/8077; C08G 18/808; C09D 175/06; C09D 175/00
See application file for complete search history.

(56) References Cited

U.S. PATENT DOCUMENTS

| | | | |
|---|---|---|---|
| 5,232,988 A | 8/1993 | Venham et al. | |
| 5,504,178 A | 4/1996 | Shaffer et al. | |
| 5,606,004 A | 2/1997 | Brahm et al. | |
| 5,629,403 A | 5/1997 | Hicks et al. | |
| 2006/0128885 A1* | 6/2006 | Rische | C08G 18/0823 524/589 |
| 2009/0131603 A1* | 5/2009 | Asahina | C08G 18/092 525/453 |
| 2009/0239998 A1 | 9/2009 | Asahina et al. | |
| 2014/0029079 A1 | 1/2014 | Hiraren et al. | |
| 2014/0248497 A1 | 9/2014 | Takei et al. | |

FOREIGN PATENT DOCUMENTS

| | | |
|---|---|---|
| CA | 2750020 A1 | 7/2010 |
| EP | 0159117 A1 | 10/1985 |
| EP | 1095956 A | 5/2001 |
| JP | S63-235321 A | 9/1988 |
| JP | H02-000620 A | 1/1990 |
| JP | H06-016771 A | 1/1994 |

(Continued)

OTHER PUBLICATIONS

Machine English translation of WO 2009/063767, Masubuchi et al., May 2009.*

(Continued)

*Primary Examiner* — Patrick D Niland
(74) *Attorney, Agent, or Firm* — Greenblum & Bernstein, P.L.C.

(57) ABSTRACT

A polyisocyanate composition having a polyisocyanate, which is a reaction product of:

a polyisocyanate precursor formed of a dimer or a multimer of at least one diisocyanate selected from the group consisting of an aliphatic diisocyanate and an alicyclic diisocyanate; and a polycarbonate diol, which is obtained by copolymerizing at least one diol selected from the group consisting of a diol having 2 to 20 carbon atoms and a carbonate compound, in which the polyisocyanate precursor has an isocyanurate group and an allophanate group, and the isocyanurate group and the allophanate group are present in a molar ratio (the isocyanurate group/the allophanate group) of 80:20 or more and 99:1 or less.

10 Claims, No Drawings

(56) References Cited

FOREIGN PATENT DOCUMENTS

| | | | |
|---|---|---|---|
| JP | H06-299116 A | | 10/1994 |
| JP | H07-207226 A | | 8/1995 |
| JP | H08-003268 A | | 1/1996 |
| JP | H08-059771 A | | 3/1996 |
| JP | H09-151230 A | | 6/1997 |
| JP | H10-007757 A | | 1/1998 |
| JP | H10-168155 A | | 6/1998 |
| JP | H11-171966 A | | 6/1999 |
| JP | 2001-270929 A | | 10/2001 |
| JP | 2003-155322 A | | 5/2003 |
| JP | 2010-280837 A | | 12/2010 |
| JP | 2012-107091 A | | 6/2012 |
| KR | 2008-0045233 A | | 5/2008 |
| NO | 2012-141250 A | | 10/2012 |
| WO | WO 2009/063767 | * | 5/2009 |
| WO | 2009-098841 A1 | | 8/2009 |
| WO | 2013-054659 A | | 4/2013 |

OTHER PUBLICATIONS

International Search Report issued with respect to application No. PCT/JP2014/066733, dated Sep. 22, 2014.
International Preliminary Report on Patentability issued with respect to application No. PCT/JP2014/066733, dated Dec. 29, 2015.
Supplementary European Search Report issued with respect to Application No. 14816606.9 dated May 13, 2016.

* cited by examiner

POLYISOCYANATE COMPOSITION AND METHOD OF MANUFACTURING THE SAME, BLOCKED POLYISOCYANATE COMPOSITION AND METHOD OF MANUFACTURING THE SAME, RESIN COMPOSITION, CURABLE RESIN COMPOSITION AND HARDENED MATERIAL

TECHNICAL FIELD

The present invention relates to a polyisocyanate composition and a method of manufacturing the same, a blocked polyisocyanate composition and a method of manufacturing the same, a resin composition, a curable resin composition and a hardened material.

BACKGROUND ART

A polyurethane resin obtained by using a polyisocyanate consisting of an aliphatic diisocyanate or an alicyclic diisocyanate as a hardener is excellent in e.g., chemical resistance, flexibility and weather resistance. The polyisocyanate, when it is used as a polyurethane paint hardener, may be applied to a wide variety of substrates. When the polyisocyanate is applied to a flexible substrate such as a thin plate, a plastic film, cloth, leather and rubber, or when the polyisocyanate is applied to a hard substrate such as an aluminum plate, an iron plate, a copper plate and a stainless steel plate and thereafter purposely deformed, the coated film is required to have extensibility in order to follow deformation. For attaining such extensibility, a method of using a polyol as an auxiliary material to previously modify a polyisocyanate is suggested.

For example, Patent Literature 1 proposes an isocyanate composition using a polyester polyol as the polyol, whereas Patent Literature 2 proposes an isocyanate composition using a polyether polyol as the polyol.

In the meantime, a blocked polyisocyanate, which is a polyisocyanate having isocyanate groups blocked with a thermally dissociable blocking agent, is used. The blocked polyisocyanate, even if it is mixed with an active hydrogen compound (base resin) such as a polyol and a polyamine, does not react with the active hydrogen compound at normal temperature; however, if the blocked polyisocyanate is heated to dissociate a thermally dissociable blocking agent, thereby regenerating an isocyanate group, the reaction with an active hydrogen compound proceeds. Because of this, a base resin and a hardener can previously be stored as a mixture. As examples of the blocked polyisocyanate, Patent Literatures 3 and 4 propose blocked polyisocyanate compositions.

CITATION LIST

Patent Literatures

Patent Literature 1: Japanese Patent Laid-Open No. H10-7757
Patent Literature 2: Japanese Patent Laid-Open No. H10-168155
Patent Literature 3: Japanese Patent Laid-Open No. H02-620
Patent Literature 4: European Patent Publication No. 0159117

SUMMARY OF INVENTION

Technical Problem

The isocyanate composition described in Patent Literature 1, however, is insufficient in water resistance, whereas, the isocyanate composition described in Patent Literature 2 is insufficient in heat resistance and staining resistance. The blocked polyisocyanate compositions described in Patent Literatures 3 and 4 have a problem of fragility because they are not extensible.

Even if a polyisocyanate as described in Patent Literatures 1 and 2 is converted to a blocked polyisocyanate with the help of a thermally dissociable blocking agent as described in Patent Literatures 3 and 4 and used as a hardener for a polyurethane resin, the same problems as mentioned above are produced.

Accordingly, further improvement is required to obtain water resistant, heat resistance, staining resistance, extensibility and workability in balance.

The present invention was made in consideration of the aforementioned problems. An object of the invention is to provide a polyisocyanate composition that can provide a hardened material excellent in drying property, heat resistance, staining resistance, extensibility and surface smoothness and a method of manufacturing the same; a blocked polyisocyanate composition that can provide a hardened material excellent in water resistance, heat resistance, staining resistance, extensibility and surface smoothness and a method of manufacturing the same; a resin composition containing the polyisocyanate or blocked polyisocyanate composition; and a hardened material.

Solution to Problem

The present inventors intensively conducted studies with a view to solving the above problems. As a result, they found that the problems can be solved by a polyisocyanate having an isocyanurate group and an allophanate group within predetermined ranges and having a polycarbonate structure, and accomplished the present invention.

More specifically, the present invention is as follows.
[1] A polyisocyanate composition comprising a polyisocyanate, which is a reaction product of:
  a polyisocyanate precursor formed of a dimer or a multimer of at least one diisocyanate selected from the group consisting of an aliphatic diisocyanate and an alicyclic diisocyanate; and
  a polycarbonate diol, which is obtained by copolymerizing at least one diol selected from the group consisting of a diol having 2 to 20 carbon atoms and a carbonate compound, wherein
  the polyisocyanate precursor has an isocyanurate group and an allophanate group, and
  the isocyanurate group and the allophanate group are present in a molar ratio (the isocyanurate group/the allophanate group) of 80:20 or more and 99:1 or less.
[2] The polyisocyanate composition according to Item 1, wherein the polycarbonate diol is obtained by copolymerization of at least two diols selected from the group consisting of a diol having 2 to 20 carbon atoms and the carbonate compound.
[3] The polyisocyanate composition according to Item 2, wherein the polycarbonate diol is obtained by copolymerization of at least two diols selected from the group consisting of a diol having 3 to 6 carbon atoms and the carbonate compound.

[4] The polyisocyanate composition according to Item 3, wherein the polycarbonate diol is obtained by copolymerization of a diol having 5 carbon atoms, a diol having 6 carbon atoms and the a carbonate compound.

[5] The polyisocyanate composition according to Item 3, wherein the polycarbonate diol is obtained by copolymerization of two or more isomers of a diol having 4 carbon atoms and the carbonate compound.

[6] The polyisocyanate composition according to Item 3, wherein the polycarbonate diol is obtained by copolymerization of a diol having 4 carbon atoms, a diol having 6 carbon atoms and the carbonate compound.

[7] The polyisocyanate composition according to any one of Items 1 to 6, wherein the polyisocyanate precursor is derived from a monoalcohol having 4 to 9 carbon atoms.

[8] A blocked polyisocyanate composition comprising a reaction product between the polyisocyanate composition according to any one of Items 1 to 7 and a thermally dissociable blocking agent.

[9] The blocked polyisocyanate composition according to Item 8, wherein the thermally dissociable blocking agent is at least one selected from the group consisting of an oxime compound, an acid amide compound, an amine compound, an active methylene compound and a pyrazole compound.

[10] A method for producing a polyisocyanate composition comprising:

step 1 of subjecting at least one diisocyanate selected from the group consisting of an aliphatic diisocyanate and an alicyclic diisocyanate to an isocyanurate reaction and an allophanatization reaction, to obtain a polyisocyanate precursor; and step 2 of reacting the polyisocyanate precursor with a polycarbonate diol, which is obtained by copolymerization of at least one diol selected from the group consisting of a diol having 2 to 20 carbon atoms with a carbonate compound, to obtain a polyisocyanate.

[11] A method for producing a blocked polyisocyanate composition comprising:

step 3 of subjecting at least one diisocyanate selected from the group consisting of an aliphatic diisocyanate and an alicyclic diisocyanate to an isocyanurate reaction and an allophanatization reaction, to obtain a polyisocyanate precursor; and step 4 of reacting the polyisocyanate precursor, a polycarbonate diol, which is obtained by copolymerization of at least one diol selected from the group consisting of a diol having 2 to 20 carbon atoms and a carbonate compound, and a thermally dissociable blocking agent, to obtain a blocked polyisocyanate.

[12] A resin composition comprising:

the polyisocyanate composition according to any one of Items 1 to 7 and/or the blocked polyisocyanate composition according to Item 8 or 9; and an active hydrogen compound.

[13] A hardened material obtained by hardening the resin composition according to Item 12.

Advantageous Effects of Invention

According to the present invention, it is possible to provide a polyisocyanate composition that can provide a hardened material excellent in drying property, water resistance, heat resistance, staining resistance, extensibility and surface smoothness and a method of manufacturing the same; a blocked polyisocyanate composition that can provide a hardened material excellent in water resistance, heat resistance, staining resistance, extensibility and surface smoothness and a method of manufacturing the same; a resin composition containing the polyisocyanate or blocked polyisocyanate composition; and a hardened material.

DESCRIPTION OF EMBODIMENT

Now, an embodiment for carrying out the present invention (hereinafter referred to as "the present embodiment") will be more specifically described below; however, the present invention is not limited to this. The invention can be modified in various ways within the scope of the invention.

[Polyisocyanate Composition]

The polyisocyanate composition according to the present embodiment contains a polyisocyanate, which is constituted of a polyisocyanate precursor formed of a dimer or a multimer of at least one diisocyanate selected from the group consisting of aliphatic diisocyanates and alicyclic diisocyanates, and a polycarbonate diol, which is a reaction product between at least one diol selected from the group consisting of diols having 2 to 20 carbon atoms and a carbonate compound, in which the polyisocyanate precursor has an isocyanurate group and an allophanate group, and the molar ratio of the isocyanurate group and the allophanate group (isocyanurate group/allophanate group) is 80:20 or more and 99:1 or less.

[Polyisocyanate]

The polyisocyanate used in the present embodiment comprises a polyisocyanate precursor formed of a dimer or a multimer of at least one diisocyanate selected from the group consisting of aliphatic diisocyanates and alicyclic diisocyanates, and a polycarbonate diol, which is a reaction product between at least one diol selected from the group consisting of diols having 2 to 20 carbon atoms and a carbonate compound.

[Polyisocyanate Precursor]

The polyisocyanate precursor used in the present embodiment is formed of a dimer or a multimer of at least one diisocyanate selected from the group consisting of aliphatic diisocyanates and alicyclic diisocyanates (hereinafter sometimes collectively referred to as "diisocyanates"). In addition, the polyisocyanate precursor has an isocyanurate group and an allophanate group and the molar ratio of the isocyanurate group and the allophanate group (isocyanurate group/allophanate group) is 80:20 or more and 99:1 or less.

[Aliphatic Diisocyanate]

In the present embodiment, the "aliphatic diisocyanate" refers to a compound having, other than an isocyanate group, a linear or branched aliphatic hydrocarbon and not having an aromatic hydrocarbon in a molecule. Examples of the aliphatic diisocyanate to be used in the present embodiment include, but are not particularly limited to, butane diisocyanate, pentane diisocyanate, hexamethylene diisocyanate (hereinafter also referred to as "HDI"), trimethylhexamethylene diisocyanate and lysine diisocyanate. It is preferable to use such an aliphatic diisocyanate since low-viscosity polyisocyanate precursor can be obtained.

[Alicyclic Diisocyanate]

In the present embodiment, the "alicyclic diisocyanate" refers to a compound having an alicyclic hydrocarbon without aromaticity in a molecule. Examples of the alicyclic diisocyanate to be used in the present embodiment include, but are not particularly limited to, isophorone diisocyanate, hydrogenated xylylene diisocyanate, hydrogenated diphenylmethane diisocyanate and 1,4-cyclohexane diisocyanate.

Of the above aliphatic diisocyanates and alicyclic diisocyanates, HDI, isophorone diisocyanate, hydrogenated xylylene diisocyanate and hydrogenated diphenylmethane diisocyanate are preferable since they are industrially easily obtained. Among them, HDI is more preferable. When HDI is used, the coating film obtained from the polyisocyanate composition tends to have more excellent weather resistance and flexibility.

The aliphatic diisocyanates and alicyclic diisocyanates may be used alone or in combination of two or more.

Next, the polyisocyanate precursor comprising a dimer or a multimer of the diisocyanate and using at least one of the aforementioned diisocyanates as a raw material will be described. The polyisocyanate precursor has both an isocyanurate group represented by the following formula (1) and an allophanate group represented by the following formula (2).

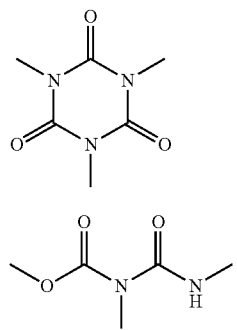

In the polyisocyanate precursor of the present embodiment, the molar ratio of the isocyanurate group and the allophanate group (isocyanurate group/allophanate group) is 80:20 or more and 99:1 or less, preferably 89:11 or more and 99:1 or less and more preferably 95:5 or more and 99:1 or less. When the molar ratio falls within the range, appearance of the coating film after staining resistance and water resistant tests is excellent. The molar ratio of the isocyanurate group and the allophanate group can be obtained by the method described in Examples.

(Other Raw Materials)

As other raw materials for the polyisocyanate precursor, although it is not particularly limited to, for example, monoalcohol, diol or a polyol such as triol can be used. Among them, for the reason that viscosity is low, a monoalcohol is preferably used.

As the monoalcohol, although it is not particularly limited to, for example, a monoalcohol having 1 to 20 carbon atoms is preferable. The lower limit of the carbon atoms of the monoalcohol is preferably 2, more preferably 3, further preferably 4 and further more preferably 6. In contrast, the upper limit of the carbon atoms of the monoalcohol is preferably 16, more preferably 12 and further preferably 9. Monoalcohols may be used alone or as a mixture of two or more.

The monoalcohol may have an ether group, an ester group or a carbonyl group in the molecule. Among them, a monoalcohol constituted only of a saturated hydrocarbon group is preferable and a monoalcohol constituted only of a branched and saturated hydrocarbon group is more preferable. Examples of such a monoalcohol include, but are not particularly limited to, methanol, ethanol, 1-propanol, 2-propanol, 1-butanol, 2-butanol, isobutanol, n-butanol, 1-pentanol, 2-pentanol, isoamyl alcohol, 1-hexanol, 2-hexanol, 1-heptanol, 1-octanol, 2-ethyl-1-hexanol, 3,3,5-trimethyl-1-hexanol, tridecanol, pentadecanol, palmityl alcohol, stearyl alcohol, 1,3,5-trimethyl cyclohexanol, cyclopentanol, cyclohexanol, methyl cyclohexanol and trimethyl cyclohexanol. Among them, isobutanol, n-butanol, isoamyl alcohol, 1-hexanol, 1-heptanol, 1-octanol, 2-ethyl-1-hexanol, tridecanol, pentadecanol, palmityl alcohol, stearyl alcohol and 1,3,5-trimethyl cyclohexanol are preferable. When such a monoalcohol is used, the resultant polyisocyanate composition and blocked polyisocyanate composition tend to have more excellent compatibility with e.g., an active hydrogen compound to be mixed with the polyisocyanate composition.

[Method for Producing Polyisocyanate Precursor]

Examples of the method for producing the polyisocyanate precursor, although it is not particularly limited to, include the following two methods.

(i) A method for obtaining a polyisocyanate precursor by carrying out an urethanization reaction between a monoalcohol and a diisocyanate, simultaneously with or followed by an allophanatization reaction and an isocyanurate reaction.

(ii) A method for obtaining a polyisocyanate precursor by mixing a diisocyanate multimer having an allophanate group and an isocyanurate group obtained through an urethanization reaction between a monoalcohol and a diisocyanate, simultaneously with or followed by an allophanatization reaction and an isocyanurate reaction, and a diisocyanate multimer having an isocyanurate group obtained through an isocyanurate reaction of a diisocyanate, or a diisocyanate multimer having an allophanate group and an isocyanurate group.

Among them, in view of simpleness of production process, the method (i) is more preferable.

[Urethanization Reaction]

The reaction temperature of the urethanization reaction is preferably 20 to 200° C., more preferably 40 to 150° C. and further preferably 60 to 120° C. When the reaction temperature is 20° C. or more, the rate of the reaction tends to be increased. In contrast, when the reaction temperature is 200° C. or less, a side reaction such as an urethodione reaction is further suppressed and coloration of the reaction product tends to be more suppressed.

The reaction time is preferably 10 minutes to 24 hours, more preferably 15 minutes to 15 hours and further preferably 20 minutes to 10 hours. When the reaction time is 10 minutes or more, the reaction can be sufficiently completed. In contrast, when the reaction time is 24 hours or less, production efficiency is enhanced and a side reaction tends to be further suppressed. The urethanization reaction can be carried out in the absence of a catalyst or in the presence of catalyst such as a tin catalyst or an amine catalyst.

[Isocyanurate Reaction or Allophanatization and Isocyanurate Reaction]

The reaction temperature of an isocyanurate reaction or allophanatization and isocyanurate reaction is preferably 20 to 180° C., more preferably 30 to 160° C., further preferably 40 to 140° C., further more preferably 60 to 130° C.; and further more preferably 80 to 110° C. When the reaction temperature is 20° C. or more, the amount of catalyst can be reduced; at the same time, a side reaction such as a nylon reaction tends to more hardly be occurred. In contrast, when the reaction temperature is 180° C. or less, a side reaction such as an urethodione reaction is further suppressed and coloration of the reaction product tends to be further suppressed.

The reaction time of the isocyanurate reaction or allophanatization and isocyanurate reaction is preferably 10 minutes to 24 hours, more preferably 15 minutes to 12 hours, further preferably 20 minutes to 8 hours and further more preferably 20 minutes to 6 hours. When the reaction time is 10 minutes or more, the reaction tends to be more easily controlled. In contrast, when the reaction time falls within the range of 24 hours, production efficiency tends to be more improved.

In the method (i), the allophanatization reaction and isocyanurate reaction are preferably carried out in the presence of a catalyst, and particularly a catalyst that can provide a polyisocyanate having a molar ratio of an isocyanurate group to an allophanate group within the range of 80:20 or more and 99:1 or less is preferably selected. Examples of such a catalyst for the allophanatization and isocyanurate reaction, although it is not particularly limited to, include a carboxylate such as tetraalkylammonium and hydroxyalkylammonium; hydroxide; an aminosilyl group-containing compound; a carboxylate of lead, zinc, bismuth, tin, zirconyl or zirconium; an alkoxide of zinc, zirconium or tin; or a mixture of these.

In the method (ii), the allophanatization reaction and isocyanurate reaction are preferably carried out in the presence of a catalyst, and particularly a catalyst that can provide a polyisocyanate having a molar ratio of an isocyanurate group to an allophanate group within the range of 1:99 or more and 99:1 or less is preferably selected. Examples of such a catalyst for the allophanatization and isocyanurate reaction, although it is not particularly limited to, include a carboxylate such as tetraalkylammonium and hydroxyalkylammonium; hydroxide; an aminosilyl group-containing compound; a carboxylate of lead, zinc, bismuth, tin, zirconyl or zirconium; an alkoxide of zinc, zirconium or tin; or a mixture of these.

In the method (ii), in the case where a polyisocyanate containing an isocyanurate group is produced, the isocyanurate reaction is preferably carried out in the presence of a catalyst. Examples of such a catalyst for the isocyanurate reaction, although it is not particularly limited to, include a carboxylate such as tetraalkylammonium, hydroxyalkylammonium and an alkali metal salt; hydroxide; an aminosilyl group-containing compound; or a mixture of these.

The amounts of an allophanatization and isocyanurate catalyst and an isocyanurate catalyst used are each, in view of catalytic activity, preferably 0.001 to 2.0 mass % and more preferably 0.01 to 0.5 mass % based on the total weight of a reaction solution.

In the method for producing the polyisocyanate precursor, a method of adding the isocyanurate catalyst or the allophanatization and isocyanurate catalyst is not limited. For example, the catalysts may be added before an urethane group-containing compound is produced, in short, prior to the urethanization reaction between a diisocyanate and an alcohol; during an urethanization reaction between a diisocyanate and an organic compound having a hydroxyl group, or after an urethane group-containing compound is produced. A predetermined amount of isocyanurate catalyst or allophanatization and isocyanurate catalyst may be added in one portion or in several portions; or alternatively, a method of continuously adding the predetermined amount of catalyst at a constant addition rate may be employed.

The urethanization reaction, isocyanurate reaction, allophanatization and isocyanurate reaction proceed in the absence of a solvent; however, if necessary, an ester solvent such as ethyl acetate and butyl acetate; a ketone solvent such as methyl ethyl ketone; an aromatic solvent such as toluene, xylene and diethyl benzene; an organic solvent having no reactivity with an isocyanate group, such as dialkyl polyalkylene glycol ether; and a mixture of these can be used as a solvent.

In the method for producing the polyisocyanate precursor, the processes of the urethanization reaction, isocyanurate reaction, and allophanatization reaction and isocyanurate reaction can be monitored by measuring the content of the NCO group in a reaction solution or measuring a refractive index. The content of the NCO group in a reaction solution can be obtained by the method described in Examples.

The isocyanurate reaction as well as allophanatization reaction and isocyanurate reaction can be terminated by cooling the reaction solution to room temperature or adding a reaction terminator. When a catalyst is used, it is preferable to add a reaction terminator. Owing to this, a side reaction tends to be further suppressed. The amount of reaction terminator added is preferably 0.25 to 20 times by mole as large as the amount of the catalyst, more preferably 0.5 to 16 times and further preferably 1.0 to 12 times. When the amount added is 0.25 times or more, the catalyst can be sufficiently inactivated. When the amount added is 20 times or less, storage stability of the viscosity tends to be more satisfactory.

The reaction terminator is not particularly limited as long as it can inactivate a catalyst. Examples of the reaction terminator include, but are not particularly limited to, acidulated phosphate compounds such as phosphoric acid, pyrophosphoric acid, metaphosphoric acid and polyphosphoric acid; monoalkyl esters or dialkyl esters of phosphoric acid or pyrophosphoric acid; halogenated acetic acids such as monochloroacetic acid; benzoyl chloride, sulfonic acid ester, sulfuric acid, sulfuric acid ester, an ion exchange resin and a chelating agent. Among them, phosphoric acid, pyrophosphoric acid, metaphosphoric acid, polyphosphoric acid, a monoalkyl ester of phosphoric acid and dialkyl ester of phosphoric acid are preferable in view of industrial production, because they are not corrosive to stainless steel.

Examples of the monoester phosphate or diester phosphate include, but are not particularly limited to, monoethyl ester phosphate, diethyl ester phosphate, monobutyl ester phosphate, dibutyl ester phosphate, mono(2-ethylhexyl) ester phosphate, di(2-ethylhexyl) ester phosphate, monodecyl ester phosphate, didecyl ester phosphate, monolauryl ester phosphate, dilauryl ester phosphate, monotridecyl ester phosphate, ditridecyl ester phosphate, monooleyl ester phosphate, dioleyl ester phosphate, monotetradecyl ester phosphate, ditetradecyl ester phosphate, monohexadecyl ester phosphate, dihexadecyl ester phosphate, monooctadecyl ester phosphate, dioctadecyl ester phosphate and a mixture of these.

An adsorbent such as silica gel and activated carbon can be used as a reaction terminator. In this case, the amount of adsorbent added relative to diisocyanate used in a reaction is preferably 0.05 to 10 mass %.

After completion of the reaction, an unreacted diisocyanate and a solvent may be separated from a polyisocyanate precursor. In view of safety, an unreacted diisocyanate is preferably separated. Examples of a method for separating an unreacted diisocyanate and a solvent, although it is not particularly limited to, include a thin film distillation method and a solvent extraction method.

[Polycarbonate Diol]

A polycarbonate diol used in the present embodiment is obtained by copolymerizing at least one diol selected from the group consisting of diols having 2 to 20 carbon atoms and a carbonate compound. Now, the polycarbonate diol will be described below.

The number average molecular weight of a polycarbonate diol to be used in the present embodiment is preferably 300 to 4000, more preferably 400 to 2500 and further preferably 500 to 2000. When the number average molecular weight falls within the above range, flexibility and workability tends to be more excellent. The number average molecular weight can be determined by the method described in Examples.

[Method for Producing Polycarbonate Diol]

Examples of the method for producing a polycarbonate diol, although it is not particularly limited to, include a method of obtaining a polycarbonate diol by subjecting e.g., one diol and a carbonate compound to a dealcoholization reaction or a de-phenol reaction. Alternatively, a polycarbonate diol can be obtained by a transesterification reaction of a high molecular-weight polycarbonate polyol by one diol.

Note that a method of carrying out a polymerization reaction between a diol and a carbonate compound is not particularly limited and a method known in the art, for example, various methods described in "Polymer Reviews Vol. 9" pages 9 to 20 (published by Interscience Publishers, United States in 1964) written by H. Schnell can be used.

Examples of the one diol, although it is not particularly limited to, include a diol selected from the group consisting of aliphatic diols and aromatic diols. Among them, an alkylene glycol of 2-20 carbon atoms having two hydroxyl groups is preferable. When such a diol is used, the coating film obtained using a polyisocyanate composition tends to have more excellent weather resistance and chemical resistance. The "alkylene group" used herein may be branched or contain an alicyclic structure.

Examples of the diol include, but are not particularly limited to, ethylene glycol, 1,2-propanediol, 1,3-propanediol, 1,2-butanediol, 1,3-butanediol, 1,4-butanediol, 1,5-pentanediol, 1,6-hexanediol, 1,7-heptanediol, 1,8-octanediol, 1,9-nonanediol, 2-ethyl-1,6-hexanediol, 2-methyl-1,3-propanediol, 3-methyl-1,5-pentanediol, neopentyl glycol, 1,3-cyclohexanediol, 1,4-cyclohexanediol, 2,2'-bis (4-hydroxycyclohexyl)-propane, p-xylylenediol, p-tetrachloroxylylenediol, 1,4-dimethylol cyclohexane, bis-hydroxymethyl tetrahydrofuran, di(2-hydroxyethyl)dimethylhydantoin, diethylene glycol, dipropylene glycol, polypropylene glycol, polytetramethylene glycol, 2,6'-dihydroxy-ethyl hexyl ether, 2,4'-dihydroxy-ethyl butyl ether, 2,5'-dihydroxy-ethyl pentyl ether, 2,3'-dihydroxy-2',2'-dimethyl ethyl propyl ether and thioglycol.

Among them, a diol having 2 to 11 carbon atoms is preferable, and a diol having 3 to 6 carbon atoms is more preferable. Diols may be used alone or in combination of two or more. Among them, at least two diols selected from the group consisting of diols having 2 to 20 carbon atoms are preferable to further improve extensibility, and at least two diols selected from the group consisting of diols having 3 to 6 carbon atoms are more preferable.

As a combination of diols, a combination of a diol of 5 carbon atoms and a diol of 6 carbon atoms, a combination of two or more isomers of a diol of 4 carbon atoms, or a combination of a diol of 4 carbon atoms and a diol of 6 carbon atoms is more preferable. When the two diols are used, the coating films obtained using a polyisocyanate composition and a blocked polyisocyanate composition tend to have more excellent extensibility, heat resistance, water resistance (hydrolytic resistance) and surface smoothness. As such a diol, although they are not particularly limited to, specifically one or a combination of two or more selected from the group consisting of 1,4-butanediol, 1,5-pentanediol, 1,6-hexanediol and 2-methyl-1,3-propanediol is preferable, and a combination of 1,6-hexanediol and 1,5-pentanediol, a combination of 1,6-hexanediol and 1,4-butanediol, a combination of 1,4-butanediol and 2-methyl-1,3-propanediol are more preferable.

Examples of the carbonate compound to be used for producing a polycarbonate diol, although it is not particularly limited to, include a compound selected from an alkylene carbonate, a dialkyl carbonate, a diaryl carbonate and phosgene. Specific examples of the carbonate compound include, but are not particularly limited to, ethylene carbonate, propylene carbonate, dimethyl carbonate, diethyl carbonate, dibutyl carbonate and diphenyl carbonate. Among them, in view of convenience in production, diethyl carbonate is preferable.

[Blocked Polyisocyanate Composition]

The blocked polyisocyanate composition of the present embodiment contains a reaction product between a polyisocyanate composition as mentioned above and a thermally dissociable blocking agent.

[Thermally Dissociable Blocking Agent]

The blocked polyisocyanate composition used in the present embodiment can be produced by reacting an isocyanate group of the polyisocyanate with a thermally dissociable blocking agent to block the isocyanate group. The "thermal dissociation" used herein refers to dissociating the blocking agent bonded to an isocyanate group by heating. The temperature required for dissociation varies depending upon the structure of a blocking agent and is for example 40° C. to 300° C.

Examples of the thermally dissociable blocking agent include, but are not particularly limited to, an oxime compound, an alcohol compound, an acid amide compound, an acid imide compound, a phenol compound, an amine compound, an active methylene compound, an imidazole compound and a pyrazole compound.

Examples of the oxime compound include, but are not particularly limited to, formaldoxime, acetaldoxim, acetoxime, methyl ethyl ketoxime, and cyclohexanone oxime.

Examples of the alcohol compound include, but are not particularly limited to, methanol, ethanol, 2-propanol, n-butanol, sec-butanol, 2-ethyl-1-hexanol, 2-methoxyethanol, 2-ethoxyethanol and 2-butoxyethanol.

Examples of the acid amide compound include, but are not particularly limited to, acetanilide, amide acetate, ε-caprolactam, δ-valerolactam and γ-butyrolactam.

Examples of the acid imide compound include, but are not particularly limited to, succinimide and maleimide.

Examples of the phenolic compound include, but are not particularly limited to, phenol, cresol, ethylphenol, butylphenol, nonylphenol, dinonylphenol, styrenated phenol and hydroxy benzoate.

Examples of the amine compound include, but are not particularly limited to, diphenylamine, aniline, carbazole, di-n-propylamine, diisopropylamine and isopropylethylamine.

Examples of the active methylene compound include, but are not particularly limited to, dimethyl malonate, diethyl malonate, methyl acetoacetate, ethyl acetoacetate and acetylacetone.

Examples of the imidazole compound include, but are not particularly limited to, imidazole and 2-methylimidazole.

Examples of the pyrazole compound include, but are not particularly limited to, pyrazole, 3-methylpyrazole and 3,5-dimethylpyrazole.

Among them, in view of availability and viscosity of the produced blocked polyisocyanate composition, reaction temperature and reaction time, at least one selected from the group consisting of an oxime compound, an acid amide compound, an amine compound, an active methylene compound and a pyrazole compound is preferably contained; methyl ethyl ketoxime, 8-caprolactam, diethyl malonate, ethyl acetoacetate, diisopropylamine and 3,5-dimethylpyrazole are further preferable; and methyl ethyl ketoxime and diisopropylamine and 3,5-dimethylpyrazole are more preferable. Particularly, 3,5-dimethylpyrazole is the most preferable since low temperature hardenability and compatibility with a base resin, i.e., an active hydrogen compound can be obtained in balance.

The above thermally dissociable blocking agents may be used alone or in combination of two or more.

[Other Additives]

The polyisocyanate composition and blocked polyisocyanate composition used in the present embodiment can contain various types of solvents depending upon the use and purpose. Examples of the organic solvent to be contained include aliphatic hydrocarbon solvents such as hexane, heptane and octane; alicyclic hydrocarbon solvents such as cyclohexane and methylcyclohexane; ketone solvents such as acetone, methyl ethyl ketone, methyl isobutyl ketone and cyclohexanone; ester solvents such as methyl acetate, ethyl acetate, butyl acetate, isobutyl acetate, methyl lactate and ethyl lactate; aromatic solvents such as toluene, xylene, diethyl benzene, mesitylene, anisole, benzyl alcohol, phenyl glycol and chloro benzene; glycol solvents such as ethylene glycol monoethyl ether acetate, 3-methyl-3-methoxy butyl acetate, dipropylene glycol monomethyl ether and propylene glycol monomethyl ether; ether solvents such as diethyl ether, tetrahydrofuran and dioxane; halogenated hydrocarbon solvents such as dichloromethane, 1,2-dichloroethane and chloroform; pyrrolidone solvents such as N-methyl-2-pyrrolidone; amide solvents such as N, N-dimethylacetamide and N,N-dimethylformamide; sulfoxide solvents such as dimethyl sulfoxide; lactone solvents such as γ-butyrolactone; amine solvents such as morpholine; and a mixture of these. These solvents may be used alone or in combination of two or more.

The polyisocyanate composition and blocked polyisocyanate composition may contain various additives such as a hardening acceleration catalyst, an antioxidant, an ultraviolet absorber, a light stabilizer, a pigment, a leveling agent, a plasticizer, a rheology controller and a surfactant depending on the purpose and use.

Examples of the hardening acceleration catalyst include, but are not particularly limited to, tin compounds such as dibutyltin dilaurate, dibutyltin diacetate, dioctyltin dilaurate, dimethyltin dineodecanoate and tin bis(2-ethyl hexanoate); zinc compounds such as zinc 2-ethyl hexanoate and zinc naphthenate; titanium compounds such as titanium 2-ethyl hexanoate and titanium diisopropoxy bis(ethylacetonate); cobalt compounds such as cobalt 2-ethyl hexanoate and cobalt naphthenate; bismuth compounds such as bismuth 2-ethyl hexanoate and bismuth naphthenate; zirconium compounds such as zirconium tetraacetylacetonate, zirconyl 2-ethyl hexanoate and zirconyl naphthenate; and amine compounds.

Examples of the antioxidant include, but are not particularly limited to, a hindered phenol compound, a phosphorus compound and a sulfur compound.

Examples of the ultraviolet absorber include, but are not particularly limited to, a benzotriazole compound, a triazine compound and a benzophenone compound.

Examples of the light stabilizer include, but are not particularly limited to, a hindered amine compound, a benzotriazole compound, a triazine compound, a benzophenone compound and a benzoate.

Examples of the pigment include, but are not particularly limited to, a titanium oxide, carbon black, indigo, quinacridone, pearl mica and aluminum.

Examples of the leveling agent include, but are not particularly limited to, silicone oil.

Examples of the plasticizer include, but are not particularly limited to, a phthalate, a phosphoric acid compound and a polyester compound.

Examples of the rheology controller include, but are not particularly limited to, hydroxyethyl cellulose, an urea compound and micro gel.

Examples of the surfactant include, but are not particularly limited to, an anionic surfactant, a cationic surfactant and an amphoteric surfactant known in the art.

[Method for Producing Polyisocyanate Composition]

A method for producing a polyisocyanate composition according to the present embodiment has Step 1 of subjecting at least one diisocyanate selected from the group consisting of aliphatic diisocyanates and alicyclic diisocyanates to an isocyanurate reaction and an allophanatization reaction, to obtain a polyisocyanate precursor, and Step 2 of reacting the polyisocyanate precursor with a polycarbonate diol, which is obtained by copolymerization of at least one diol selected from the group consisting of diols having 2 to 20 carbon atoms with a carbonate compound, to obtain a polyisocyanate.

[Step 1]

Step 1 is a step of subjecting at least one diisocyanate selected from the group consisting of aliphatic diisocyanates and alicyclic diisocyanates to an isocyanurate reaction and an allophanatization reaction, to obtain a polyisocyanate precursor.

As Step 1, although it is not particularly limited to, for example, the aforementioned method for producing a polyisocyanate precursor can be used. As the diisocyanate, the same diisocyanates as mentioned above can be used.

[Step 2]

Step 2 is a step of reacting a polyisocyanate precursor with a polycarbonate diol, which is obtained by copolymerization of at least one diol selected from the group consisting of diols having 2 to 20 carbon atoms and a carbonate compound, to obtain a polyisocyanate.

Examples of the method of reacting a polyisocyanate precursor with a polycarbonate diol, although it is not particularly limited to, include a method of binding an isocyanate group of an polyisocyanate precursor to a hydroxyl group of a polycarbonate diol to form an urethane group.

As the diol and carbonate compound, the same compounds as mentioned above can be used.

In reacting a polyisocyanate precursor with a polycarbonate diol, the reaction ratio of isocyanate group/hydroxyl group (NCO/OH) is preferably 2.0 to 37, more preferably 2.5 to 30, further preferably 3.0 to 25 and further more preferably 3.0 to 20 in view of viscosity, workability and extensibility. When the ratio of NCO/OH falls within the above range, more excellent staining resistance and extensibility tend to be obtained.

The reaction between a polyisocyanate precursor and a polycarbonate diol can be generally carried out at −20 to 150° C. and preferably 30 to 100° C. When the reaction temperature is 150° C. or less, the possibility of causing a side reaction becomes low. In contrast, when the reaction temperature is −20° C. or more, the reaction rate is not excessively low.

[Method for Producing a Blocked Polyisocyanate Composition]

A method for producing a blocked polyisocyanate composition according to the present embodiment has Step 3 of subjecting at least one diisocyanate selected from the group consisting of aliphatic diisocyanates and alicyclic diisocyanates to an isocyanurate reaction and an allophanatization reaction, to obtain a polyisocyanate precursor; and Step 4 of reacting the polyisocyanate precursor, a polycarbonate diol, which is obtained by copolymerization of at least one diol selected from the group consisting of diols having 2 to 20 carbon atoms and a carbonate compound, and a thermally dissociable blocking agent, to obtain a blocked polyisocyanate.

[Step 3]

Step 3 is a step of subjecting at least one diisocyanate selected from the group consisting of aliphatic diisocyanates and alicyclic diisocyanates to an isocyanurate reaction and an allophanatization reaction, to obtain a polyisocyanate precursor.

As Step 3, although it is not particularly limited to, for example, the aforementioned method for producing a polyisocyanate precursor can be used. As the diisocyanate, the same diisocyanates as mentioned above can be used.

[Step 4]

Step 4 is a step of reacting the polyisocyanate precursor, a polycarbonate diol, which is obtained by copolymerization of at least one diol selected from the group consisting of diols having 2 to 20 carbon atoms and a carbonate compound, and a thermally dissociable blocking agent, to obtain a blocked polyisocyanate. The polyisocyanate precursor reacts with the polycarbonate diol to produce a polyisocyanate and the thermally dissociable blocking agent reacts with an isocyanate group in the reaction system to produce a blocked isocyanate group. The blocked isocyanate group refers to an isocyanate group to which a thermally dissociable blocking group is bonded.

As the diol, carbonate compound and thermally dissociable blocking agent, the same compounds as mentioned above can be used.

In the blocking reaction using a thermally dissociable blocking agent, all or part of isocyanate groups may be blocked and preferably all isocyanate groups are blocked. When all isocyanate groups are blocked, the ratio of (the mole number of thermally dissociable blocking agent)/(the mole number of isocyanate groups contained in a reaction product between a polyisocyanate precursor and a polycarbonate diol) is preferably 1.0 to 1.5, more preferably 1.0 to 1.3 and further preferably 1.0 to 1.2. In this case, excessive or unreacted thermally dissociable blocking agent remains in the blocked polyisocyanate composition.

A thermally dissociable blocking agent may be added after or during the reaction of a polyisocyanate precursor and a polycarbonate diol; or may be added simultaneously with the polycarbonate diol. Alternatively, a thermally dissociable blocking agent may be added before the reaction to block part of isocyanate groups of the polyisocyanate precursor and thereafter, the partially blocked polyisocyanate precursor can be reacted with a polycarbonate diol. Among them, it is preferable to add a thermally dissociable blocking agent after completion of the reaction of a polyisocyanate precursor and a polycarbonate diol.

The reaction among a polyisocyanate precursor, a polycarbonate diol and a thermally dissociable blocking agent is carried out in the absence of a solvent or, if necessary, an organic solvent having no reactivity with an isocyanate group may be used.

Specific examples of such an organic solvent that can be used include, but are not particularly limited to, organic solvents having no reactivity with an isocyanate group, which include aliphatic hydrocarbon solvents such as hexane, heptane and octane; alicyclic hydrocarbon solvents such as cyclohexane and methyl cyclohexane; ketone solvents such as acetone, methyl ethyl ketone, methyl isobutyl ketone and cyclohexanone; ester solvents such as methyl acetate, ethyl acetate, butyl acetate and isobutyl acetate; aromatic solvents such as toluene, xylene, diethyl benzene, mesitylene, anisole and chlorobenzene; glycol solvents such as ethylene glycol monoethyl ether acetate and 3-methyl-3-methoxy butyl acetate and propylene glycol monomethyl ether acetate; ether solvents such as diethyl ether, tetrahydrofuran and dioxane; halogenated hydrocarbon solvents such as dichloromethane, 1,2-dichloroethane and chloroform; pyrrolidone solvents such as N-methyl-2-pyrrolidone; amide solvents such as N,N-dimethylacetamide and N,N-dimethyl formamide; sulfoxide solvents such as dimethyl sulfoxide; lactone solvents such as γ-butyrolactone; and amine solvents such as morpholine; and mixtures of these. The organic solvent can be removed after completion of the reaction.

The reaction temperature, in view of suppression of a side reaction and production efficiency, is preferably −20 to 150° C. and more preferably 30 to 120° C.

In the reaction, an organometallic salt such as tin, zinc and lead; a tertiary amine compound; an alcoholate of an alkali metal such as sodium may be used as a catalyst.

[Resin Composition]

The resin composition according to the present embodiment contains the polyisocyanate composition and/or the blocked polyisocyanate composition and an active hydrogen compound. Since the active hydrogen compound is contained, an isocyanate group of the polyisocyanate composition or the blocked polyisocyanate composition reacts with active hydrogen of the active hydrogen compound in various conditions to successfully provide a hardened material excellent in water resistance, heat-resistance, staining resistance, extensibility and surface smoothness.

[Active Hydrogen Compound]

The active hydrogen compound (polyvalent active hydrogen compound) is not particularly limited as long as at least two active hydrogen atoms are bound in a molecule. Examples thereof include polyamine, alkanolamine, polythiol and polyol. Among them, a polyol is frequently used.

Examples of the polyamine include, but are not limited to, diamines such as ethylenediamine, propylenediamine, butylenediamine, triethylenediamine, hexamethylenediamine, 4,4'-diamino-dicyclohexylmethane, piperazine, 2-methylpiperazine, and isophoronediamine; linear polyamines having three or more amino groups, such as bis-hexamethylentriamine, diethylenetriamine, triethylene tetramine, tetraethylenepentamine, pentamethylenehexamine and tetrapropylenepentamine; and cyclic polyamines such as 1,4,7,10,13,16-hexaazacyclo octadecane, 1,4,7,10-tetraazacyclodecane, 1,4,8,12-tetraazacyclopentadecane and 1,4,8,11-tetraazacyclotetradecane.

Examples of the alkanolamine include, but are not particularly limited to, monoethanolamine, diethanolamine, aminoethylethanolamine, N-(2-hydroxypropyl)ethylenediamine, mono-, di-(n- or iso-) propanolamine, ethylene glycol-bis-propylamine, neo-pentanol amine and methyl ethanol amine.

Examples of the polythiol include, but are not particularly limited to, bis-(2-hydrothioethyloxy)methane, dithioethylene glycol, dithioerythritol and dithiothreitol.

Examples of the polyol include, but are not particularly limited to, a polyester polyol, an acrylic polyol, a polyether polyol, a polyolefin polyol, a fluorine polyol, a polycarbonate polyol and an epoxy resin.

Examples of the polyester polyol include, but are not particularly limited to, a polyester polyol and a polycaprolactone. The polyester polyol, although it is not particularly limited to, is, for example, obtained by a condensation reaction between a dibasic acid alone or a mixture thereof and a polyol alone or a mixture thereof. Examples of the dibasic acid, although it is not particularly limited to, include a dibasic acid selected from the group consisting of carboxylic acids such as succinic acid, adipic acid, sebacic acid, dimer acid, maleic anhydride, phthalic anhydride, isophthalic acid and terephthalic acid. Examples of the polyol, although it is not particularly limited to, include a polyol selected from the group consisting of ethylene glycol, propylene glycol, diethylene glycol, neopentyl glycol, trimethylolpropane and glycerin. The polycaprolactone, although it is not particularly limited to, is obtained, for example, by a ring-opening polymerization of ε-caprolactone using a polyol.

Examples of the acrylic polyol, although it is not particularly limited to, include a copolymer of an ethylenically unsaturated bond-containing monomer having a hydroxyl group, alone or a mixture thereof and another ethylenically unsaturated bond-containing monomer copolymerizable with this, alone or a mixture thereof.

Examples of the ethylenically unsaturated bond-containing monomer having a hydroxyl group include, but are not particularly limited to, hydroxyethyl acrylate, hydroxypropyl acrylate, hydroxybutyl acrylate, hydroxyethyl methacrylate, hydroxypropyl methacrylate and hydroxybutyl methacrylate. Among them, hydroxyethyl acrylate and hydroxyethyl methacrylate are preferable.

Examples of the another ethylenically unsaturated bond-containing monomer copolymerizable with the ethylenically unsaturated bond-containing monomer having a hydroxyl group include, but are not particularly limited to, acrylic esters such as methyl acrylate, ethyl acrylate, propyl acrylate, isopropyl acrylate, n-butyl acrylate, isobutyl acrylate, n-hexyl acrylate, cyclohexyl acrylate, 2-ethylhexyl acrylate, lauryl acrylate, benzyl acrylate and phenyl acrylate; methacrylic esters such as methyl methacrylate, ethyl methacrylate, propyl methacrylate, isopropyl methacrylate, n-butyl methacrylate, isobutyl methacrylate, n-hexyl methacrylate, cyclohexyl methacrylate, 2-ethylhexyl methacrylate, lauryl methacrylate, benzyl methacrylate and phenyl methacrylate; unsaturated carboxylic acids such as acrylic acid, methacrylic acid, maleic acid and itaconic acid; unsaturated amides such as acrylamide, methacrylamide, N,N-methylenebisacrylamide, diacetone acrylamide, diacetone methacrylamide, maleamic acid and maleimide; vinyl monomers such as glycidyl methacrylate, styrene, vinyltoluene, vinyl acetate, acrylonitrile and dibutyl fumarate; and vinyl monomers having a hydrolyzable silyl group such as vinyl trimethoxy silane, vinyl methyl dimethoxy silane and γ-(meth)acryloxypropyl trimethoxy silane.

Examples of the polyether polyol include, but are not particularly limited to, polyether polyols each obtained by adding an alkylene oxide such as an ethylene oxide, propylene oxide, butylene oxide, cyclohexene oxide and styrene oxide, alone or a mixture thereof, to polyvalent hydroxy compounds, alone or in the form of a mixture by using a hydroxide such as lithium, sodium and potassium or a strong basic catalyst such as an alcoholate and an alkyl amine; polyether polyols each obtained by reacting an alkylene oxide with an polyfunctional compound such as an ethylenediamine; and so-called polymer polyols each obtained by polymerizing an acrylamide with a polyether as mentioned above as a solvent.

Examples of the polyvalent hydroxy compound include, but are not particularly limited to, diglycerol, ditrimethylolpropane, pentaerythritol, dipentaerythritol and the like; sugar alcohol compounds such as erythritol, D-threitol, L-arabinitol, ribitol, xylitol, sorbitol, mannitol, galactitol and rhamnitol; monosaccharides such as arabinose, ribose, xylose, glucose, mannose, galactose, fructose, sorbose, rhamnose, fucose and ribodesose; disaccharides such as trehalose, sucrose, maltose, cellobiose, gentiobiose, lactose and melibiose; trisaccharides such as raffinose, gentianose and melezitose; and tetrasaccharides such as stachyose.

Examples of the polyolefin polyol include, but are not particularly limited to, polybutadiene having two or more hydroxyl groups, a hydrogenated polybutadiene, polyisoprene and hydrogenated polyisoprene.

Examples of the fluorine polyol, which is a polyol containing fluorine in a molecule, include, but are not particularly limited to, copolymers such as fluoroolefins, cyclo vinyl ethers, hydroxyalkyl vinyl ethers and monocarboxylic acid vinyl esters disclosed in e.g., Japanese Patent Laid-Open No. 57-34107 and Japanese Patent Laid-Open No. 61-275311.

Examples of the polycarbonate polyol include, but are not particularly limited to, polycarbonate polyols obtained by polycondensation between low molecular-weight carbonate compounds e.g., dialkyl carbonates such as dimethyl carbonate, alkylene carbonate such as ethylene carbonate, and diarylcarbonate such as diphenyl carbonate; and a low molecular-weight polyol used in the aforementioned polyester polyol.

Examples of the epoxy resin include, but are not particularly limited to, a novolak epoxy resin, a glycidyl ether epoxy resin, a glycol ether epoxy resin, an epoxy resin of aliphatic unsaturated compounds, an epoxy resin of a fatty acid ester, a polycarboxylic acid ester epoxy resin, an amino glycidyl epoxy resin, a β-methyl epichlorohydrine epoxy resin, a cyclic oxirane epoxy resin, a halogen epoxy resin and a resorcin epoxy resin.

The hydroxyl value of a polyol, in view of crosslink density and mechanical properties of a hardened material, is preferably 10 to 300 mgKOH/g per resin composition, more preferably 20 to 250 mgKOH/g and further preferably 30 to 200 mgKOH/g.

In the resin composition according to the present embodiment, the molar equivalent ratio (the isocyanate group or blocked isocyanate group contained in a polyisocyanate or a blocked polyisocyanate:the active hydrogen group contained in an active hydrogen compound) is preferably 10:1 to 1:10, preferably 8:1 to 1:8 and further preferably 6:1 to 1:6.

The resin composition may contain another hardener such as a melamine hardener and an epoxy hardener. Examples of the melamine hardener include, but are not particularly limited to, completely alkyl-etherified melamine resin, methylol group-containing melamine resin and an imino group-containing melamine resin partly having an imino group.

In the case where a melamine hardener is used in combination, addition of an acidic compound is effective. Specific examples of the acidic compound include, but are not particularly limited to, a carboxylic acid, a sulfonic acid, an acidic phosphoric acid ester and a phosphorous acid ester.

Examples of the carboxylic acid include, but are not particularly limited to, acetic acid, lactic acid, succinic acid, oxalic acid, maleic acid and decane dicarboxylic acid.

Examples of the sulfonic acid include, but are not particularly limited to paratoluenesulfonic acid, dodecyl benzenesulfonic acid and dinonylnaphthalene disulfonic acid.

Examples of the acidic phosphoric acid ester include, but are not particularly limited to, dimethyl phosphate, diethyl phosphate, dibutyl phosphate, dioctyl phosphate, dilauryl phosphate, monomethyl phosphate, monoethyl phosphate, monobutyl phosphate and monooctyl phosphate.

Examples of the phosphorous acid ester include, but are not particularly limited to, diethyl phosphite, dibutyl phosphite, dioctyl phosphite, dilauryl phosphite, monoethyl phosphite, monobutyl phosphite, monooctyl phosphite and monolauryl phosphite.

Examples of the epoxy hardener include, but are not particularly limited to, an aliphatic polyamine, an alicyclic polyamine, an aromatic polyamine, an acid anhydride, phenol novolac, a polymercaptan, an aliphatic tertiary amine, an aromatic tertiary amine, an imidazole compound and a Lewis acid complex.

The resin composition can contain other additives depending upon the use and purpose. Examples of the additives include, but are not particularly limited to, additives for various uses, for example, curable compositions such as a paint composition, a tacking composition, an adhesive composition and a cast molding composition; various surface treatment agent compositions such as a fiber treatment agent; various elastomer compositions; cross-linking agents such as a foam-body composition; and modifiers.

[Method for Producing Resin Composition]

The method for producing a resin composition is not particularly limited. A resin composition can be obtained, for example, by mixing an active hydrogen compound (polyvalent active hydrogen compound) with the polyisocyanate composition or blocked polyisocyanate composition of the present embodiment as a base resin.

[Hardened Material]

The hardened material according to the present embodiment can be obtained by hardening a resin composition as mentioned above. In the resin composition, an isocyanate group of a polyisocyanate reacts with active hydrogen in an active hydrogen compound and becomes hardened to obtain a hardened material. When a blocked polyisocyanate composition is used, a thermally dissociable blocking agent bound to an isocyanate group is dissociated by heating and the isocyanate group reacts with active hydrogen in an active hydrogen compound to obtain a hardened material.

[Use]

The polyisocyanate composition and blocked polyisocyanate composition according to the present embodiment can be used as curable compositions such as a paint composition, a pressure-sensitive adhesive composition, an adhesive composition and an injection composition; various surface treatment agent compositions such as a fiber treatment agent; various elastomer compositions; cross-linking agents such as a foam-body composition; modifiers; and additives.

The paint composition containing a polyisocyanate composition and blocked polyisocyanate composition according to the present embodiment is preferably applied to various materials as a primer paint composition, an intermediate paint composition or a finish paint composition in accordance with a method such as roll coating, curtain flow coating, spray coating, electrostatic coating and bell coating. Also, the paint composition is preferably used for adding properties such as beautification, weather resistance, acid resistance, corrosion resistance, chipping resistance and adhesion to e.g., pre-coated metals including anti-rust steel plates, automobile coatings and plastic coatings.

As application fields for pressure-sensitive adhesive compositions and adhesive compositions containing the polyisocyanate composition and blocked polyisocyanate composition according to the present embodiment, e.g., automobiles, building materials, home electronics, woodworking and laminates for solar cells are mentioned. Among them, in optical elements for e.g., liquid crystal displays for home electronics including TVs, PCs, digital cameras and mobile phones, adherend in various kinds such as films and plates is required to be laminated in order to express various functions. Since adherend surfaces between the film and plate are required to be sufficiently tacky or adhesive, the pressure-sensitive adhesive composition and adhesive composition of the present embodiment are preferably used.

Examples of the adherend, to which e.g., a curable composition containing the polyisocyanate composition and blocked polyisocyanate composition according to the present embodiment can be applied include, but are not particularly limited to, glass; various metals such as aluminum, iron, galvanized steel plate, copper and stainless steel; porous members such as wood, paper, mortar and stone; members coated with e.g., a fluorine paint, an urethane paint and an acrylic urethane paint; sealant hardened material such as a silicone hardened material, a modified silicone hardened material and an urethane hardened material; rubbers such as vinyl chloride, natural rubber and synthetic rubber; leather such as natural leather and artificial leather; fibers such as plant fiber, animal fiber, carbon fiber and glass fiber; non-woven cloths; films and plates made of resins such as polyester, acryl, polycarbonate, triacetyl cellulose and polyolefin; and inks such as a UV-curable acrylic resin layer, a printing ink and a UV ink.

EXAMPLES

Now, the present invention will be more specifically described below by way of Examples and Comparative Examples. The present invention is not limited by the following Examples.

<Conversion Rate of Polyisocyanate Precursor>

The conversion rate of a polyisocyanate precursor was obtained by measurement of the refractive index of a reaction solution.

<Viscosity>

Viscosity at 25° C. was obtained by use of Type E viscometer RE-80U (manufactured by TOKI SANGYO Co., Ltd.).

<Content of Isocyanate Group in Polyisocyanate Precursor and Polyisocyanate Composition (the Content of NCO Group)>

The content of an NCO group in each of the following polyisocyanate precursors and polyisocyanate compositions was obtained as follows. Each toluene solution was neutralized with an excessive 2N amine and thereafter back-titrated with 1N hydrochloric acid. The content was calculated on the basis of solid content (the content in the absence of a solvent).

<Content of Blocked Isocyanate Group (Effective NCO Content) in Blocked Polyisocyanate Composition>

The effective NCO group content (on the basis of solid content) of each of the following blocked polyisocyanate compositions was calculated from the polyisocyanate precursor NCO content obtained above in accordance with the following expression.

Effective NCO content (on the basis of solid content)[%]=NCO content (on the basis of solid content) of raw-material polyisocyanate precursor [%]×(solid content (mass [g]) of raw-material polyisocyanate precursor/solid content (mass [g]) of blocked polyisocyanate composition)

<Molar Ratio of the Isocyanurate Group and the Allophanate Group in Polyisocyanate Precursor>

The ratio of an isocyanurate group and an allophanate group in each of the following polyisocyanate precursors was obtained by 1H-NMR (FT-NMR DPX-400 manufactured by Bruker). An example of a method of measuring a polyisocyanate precursor using HDI as a raw material by 1H-NMR will be described below.

An example of 1H-NMR measurement method: Each of the following polyisocyanate precursors was dissolved in deuterium chloroform in a concentration of 10 mass %. The solution contained 0.03 mass % of tetramethylsilane based on the polyisocyanate precursor. Chemical shift was checked based on the signal from hydrogen of tetramethylsilane as 0 ppm. In the measurement of 1H-NMR, the area of the signal from a hydrogen atom (hydrogen atom (1 mol) per allophanate group (1 mol)) bound to nitrogen of an allophanate group around 8.5 ppm and the area of the signal from a hydrogen atom (hydrogen atom (6 mol) per isocyanurate group (1 mol)) of a methylene group near an isocyanurate group around 3.8 ppm were measured. Based on the obtained areas and in accordance with the following expression, the molar ratio of the isocyanurate group and the allophanate group in the polyisocyanate precursor was obtained.

Isocyanurate group/allophanate group=(area of signal around 3.8 ppm/6)/(area of signal around 8.5 ppm)

<Number Average Molecular Weight of Polycarbonate Diol>

The number average molecular weight of each of the following polycarbonate diols was obtained by the following expression.

Number average molecular weight=2/(OH value of polycarbonate diol×10−3/56.11)

<OH Value of Polycarbonate Diol>

The OH value of each of the following polycarbonate diols was obtained in accordance with JIS K 0070: 1992. More specifically, acetic anhydride (12.5 g) was diluted with pyridine in a measuring cylinder to 50 mL to prepare an acetylating reagent. Subsequently, polycarbonate diol (2.5 to 5.0 g) produced in each of synthesis examples was weighed and placed in a 100-mL eggplant flask. To the eggplant flask, the acetylating reagent (5 mL) and toluene (10 mL) were added by whole pipettes. Thereafter, the eggplant flask was equipped with a cooling tube and heated at 100° C. for one hour while stirring. Distilled water (2.5 mL) was added by whole pipettes and the resultant mixture was heated for 10 min while stirring. After cooling for a few minutes, ethanol (12.5 mL) was added and a few droplets of phenolphthalein (an indicator) were added to the mixture. Then the mixture was titrated with 0.5 mol/L ethanolic potassium hydroxide.

In the meantime, a blank sample was prepared by placing an acetylating reagent (5 mL), toluene (10 mL) and distilled water (2.5 mL) in a 100-mL eggplant flask. The mixture was heated for 10 minutes while stirring and then titrated in the same manner. Based on the result and in accordance with the following expression, the OH values of test samples were calculated.

OH value (mg-KOH/g)={$(b−a)$×28.05×$f$}/$e$ a: Titer of sample (mL)
b: Titer of blank sample (mL)
e: Sample weight (g)
f: Titrant factor <Composition of Polycarbonate Diol Copolymer>

The composition of each of the following polycarbonate diol copolymers was determined as follows. In a 100-mL eggplant flask, a sample (1 g) was placed and ethanol (30 g) and potassium hydroxide (4 g) were added. The reaction mixture was allowed to react at 100° C. for one hour. After cooling to room temperature, a few droplets of phenolphthalein (an indicator) were added to the mixture and neutralized with hydrochloric acid. The mixture was cooled in the refrigerator for one hour and then the precipitated salt was removed by filtration. The resultant mixture was subjected to gas chromatographic analysis. The analysis was made by gas chromatography GC-14 B (manufactured by Shimadzu Corporation) equipped with a column, DB-WAX (manufactured by J & W) and using diethylene glycol diethyl ester as the internal standard and a detector, FID. Note that the column was maintained at 60° C. for 5 minutes and thereafter the temperature of the column was raised at a rate of 10° C./min up to 250° C.

<Evaluation Method>

[Evaluation Method for Drying Property]

To each of the following polyisocyanate compositions, Setalux 1767 (acrylic polyol, manufactured by Nuplex resins, hydroxyl-group concentration: 4.5% (resin criteria), resin solid content: 65%) was blended so as to obtain NCO/OH=1.0. The mixture was diluted with n-butyl acetate so as to obtain a solid content of 50 mass %. The resultant paint composition was applied to a glass plate by an applicator so as to obtain a resin film thickness of 40 μm. After the coating film was allowed to stand still at 23° C. for 3 hours, a cotton ball was placed on the coating film and a weight of 100 g was further placed on the cotton ball for 60 seconds. Thereafter, the weight and cotton ball were removed and trace of cotton remaining on the coating film was observed.

(Evaluation Criteria for Drying Property)

○: No cotton remains
Δ: Cotton slightly remains
X: A large amount of cotton remains

[Method of Preparing Polyurethane Resin Film]

To the following polyisocyanate composition and blocked polyisocyanate composition, Setalux 1767 (acrylic polyol manufactured by Nuplex resins, hydroxyl-group concentration: 4.5% (resin criteria), resin solid content: 65%) was blended so as to obtain NCO/OH=1.0. The mixture was diluted with n-butyl acetate so as to obtain a solid content of 50 mass %. At this time, dibutyltin dilaurate was added so as to obtain a concentration of 0.5 mass % relative to the resin. The resultant paint composition was applied to a polypropylene (PP) plate by an applicator so as to obtain a resin film thickness of 40 μm. The coating film was heated in the following conditions. Thereafter, the polyurethane resin film was obtained by being removed from the PP plate.

Examples 1 to 17, Comparative Examples 1 to 6: 60° C., 3 hours

Examples 18 to 31, Comparative Examples 7 to 10: 120° C., 30 minutes

Examples 32 and 33: 140° C., 30 minutes

[Evaluation Method for Extensibility]

The films obtained in [Method of preparing polyurethane resin film] were subjected to measurement of rupture elongation using TENSILON RTE-1210 (trade name, manufactured by A & D). Based on the rupture elongation measured, extensibility of each of the polyisocyanate compositions was evaluated in accordance with the following evaluation criteria.

Measurement Conditions:
   Tensile speed: 20 mm/min
   Sample dimensions: length 20 mm×width 10 mm×thickness 40 μm
   Temperature: 23° C.
   Humidity: 50%

(Evaluation Criteria)
   ⊚: Rupture elongation of coating film: 60% or more
   ○: Rupture elongation of coating film: 30% or more and less than 60%
   X: Rupture elongation of coating film: less than 30%

[Evaluation Method for Water Resistance]

The coating films obtained in [Evaluation method for drying property] were each soaked in warm water of 80° C. for one week. The haze of the coating film before and after the soaking was measured. The haze value of the coating film was obtained by a haze meter (trade name, manufactured by Suga Test Instruments Co., Ltd.) in accordance with JIS K7361.

(Evaluation Criteria Based on Haze Value)
   ○: Haze value is less than 2.0%
   X: Haze value is 2.0% or more The films obtained in [Method of preparing polyurethane resin film] were each soaked in warm water of 80° C. for one week. Before and after the soaking, maximum breaking stress was measured by use of TENSILON RTE-1210 (trade name, manufactured by A & D). The change rate of the maximum breaking stress measured was regarded as strength retention rate.

Measurement Conditions:
   Tensile speed: 20 mm/min
   Sample dimensions: length 20 mm×width 10 mm×thickness 40 μm
   Temperature: 23° C.
   Humidity: 50%

(Evaluation Criteria for Strength Retention Rate)
   ○: Strength retention rate is 98% or more
   Δ: Strength retention rate is 90% or more and less than 98%
   X: Strength retention rate is less than 90%

[Evaluation Method for Heat Resistance]

The films obtained in [Method of preparing polyurethane resin film] were each placed in an atmosphere of 120° C. for one week and thereafter strength retention rate was measured. Note that the strength retention rate in this test was the change rate of maximum breaking stress before and after the film was placed in the atmosphere of 120° C. and measured by use of TENSILON RTE-1210 (trade name, manufactured by A & D). Based on the strength retention rate measured, the heat resistance of the polyisocyanate composition was evaluated in accordance with the following evaluation criteria.

Measurement Conditions:
   Tensile speed: 20 mm/min Sample dimensions: length 20 mm×width 10 mm×thickness 40 μm
   Temperature: 23° C.
   Humidity: 50%

(Evaluation Criteria)
   ○: Strength retention rate is 90% or more
   X: Strength retention rate is less than 90%

[Evaluation Method for Staining Resistance]

The films obtained in [Method of preparing polyurethane resin film] were each stained with black magic marker (ZEBRA, Macky Care, black) and then rubbed reciprocally 10 times with Kimwipe impregnated with isopropyl alcohol, and then, degree of remaining magic ink was observed. Based on the degree of staining observed, the staining resistance of the polyisocyanate composition was evaluated in accordance with the following evaluation criteria.

(Evaluation Criteria)
   ⊚: Magic-ink staining is not visible
   ○: Magic-ink staining is scarcely visible
   X: Magic-ink staining is clearly visible

[Surface Smoothness of Coating Film]

To each of the polyisocyanate compositions and blocked polyisocyanate compositions obtained in Examples and Comparative Examples, Setalux 1767 (acrylic polyol, manufactured by Nuplex resins, hydroxyl-group concentration: 4.5% (resin criteria), resin solid content: 65%) was blended so as to obtain an isocyanate group/hydroxyl group=1.0 (equivalent ratio). The mixture was diluted with butyl acetate such that the viscosity was 20 seconds at 23° C. as measured by a Ford cup No. 4 viscometer to prepare a paint.

The paint was applied by air spray to cation electrodeposited plates (JIS. G. 3141: SPCC. SD) so as to obtain a dried film thickness of 40 μm. After the films were setting at 23° C. for 15 minutes, the films were heated and hardened in the following conditions.

Examples 1 to 17, Comparative Examples 1 to 6: 60° C., 3 hours

Examples 18 to 31, Comparative Examples 7 to 10: 120° C., 30 minutes

Examples 32 and 33: 140° C., 30 minutes

The surface smoothness of the resultant coating film was measured by Wave Scan DOI (manufactured by BYK Gardner).

Wa which is an amplitude index represent the surface smoothness of a wavelength of about 0.1 to 0.3 mm, and Wb which is an amplitude index represent the surface smoothness of a wavelength of about 0.3 to 1 mm, can be measured by Wave Scan DOI. A smaller measurement value indicates that the surface smoothness of the coating film is more excellent.

(Evaluation Criteria)
   ⊚: Wa is less than 10 and Wb is less than 15
   ○: Wa is less than 15 and Wb is less than 20 (excluding the case where Wa is less than 10 and Wb is less than 15)
   X: Wa is 15 or more and Wb is 20 or more Synthesis Example of Polyisocyanate Precursor Synthesis Example 1

(Synthesis of Polyisocyanate Precursor a)

The interior atmosphere of a four-necked flask equipped with a stirrer, a thermometer and a cooling tube was replaced with nitrogen. The flask was charged with HDI (1000 g) and tetramethylammonium caprylate (0.1 g) as a catalyst and isobutanol (1.0 g) were simultaneously added thereto while stirring at 60° C. Four hours later, the refractive index of the reaction solution was measured, thereby confirming whether the reaction reached a predetermined termination point, and then, phosphoric acid (0.2 g) was added to terminate the reaction. Thereafter, the reaction solution was filtered and then the unreacted HDI monomer was removed by a thin film distillation apparatus to obtain polyisocyanate precursor a. The viscosity of polyisocyanate precursor a obtained at 25° C. was 1300 mPa·s and the NCO content was 23.2%. When 1H-NMR analysis was made, the molar ratio of isocyanurate group/allophanate group was 97/3.

Synthesis Example 2

(Synthesis of Polyisocyanate Precursor b)
Polyisocyanate precursor b was obtained in the same manner as in Synthesis Example 1 except that 2-ethylhexanol (1.0 g) was used in place of isobutanol (1.0 g). The viscosity of polyisocyanate precursor b obtained at 25° C. was 1200 mPa·s and the NCO content was 23.1%. When 1H-NMR analysis was made, the molar ratio of isocyanurate group/allophanate group was 97/3.

Synthesis Example 3

(Synthesis of Polyisocyanate Precursor c)
Polyisocyanate precursor c was obtained in the same manner as in Synthesis Example 1 except that 2-ethylhexanol (3.0 g) was used in place of isobutanol (1.0 g). The viscosity of polyisocyanate precursor c obtained at 25° C. was 1000 mPa·s and the NCO content was 22.9%. When 1H-NMR analysis was made, the molar ratio of isocyanurate group/allophanate group was 95/5.

Synthesis Example 4

(Synthesis of Polyisocyanate Precursor d)
Polyisocyanate precursor d was obtained in the same manner as in Synthesis Example 1 except that isobutanol (1.0 g) and 2-ethylhexanol (5.0 g) were used in place of isobutanol (1.0 g). The viscosity of polyisocyanate precursor d obtained at 25° C. was 800 mPa·s and the NCO content was 22.8%. When 1H-NMR analysis was made, the molar ratio of isocyanurate group/allophanate group was 89/11.

Synthesis Example 5

(Synthesis of Polyisocyanate Precursor e)
Polyisocyanate precursor e was obtained in the same manner as in Synthesis Example 1 except that isobutanol (7.0 g) was used in place of isobutanol (1.0 g). The viscosity of polyisocyanate precursor e obtained at 25° C. was 950 mPa·s and the NCO content was 22.5%. When 1H-NMR analysis was made, the molar ratio of isocyanurate group/allophanate group was 81/19.

Synthesis Example 6

(Synthesis of Polyisocyanate Precursor f)
The interior atmosphere of a four-necked flask equipped with a stirrer, a thermometer and a cooling tube was replaced with nitrogen. The flask was charged with HDI (600 g) and tetramethylammonium caprylate as a catalyst was added thereto while stirring at 70° C. When the yield reached 40%, phosphoric acid was added to terminate the reaction. Thereafter, the reaction solution was filtered and then the unreacted HDI monomer was removed by a thin film distillation apparatus to obtain polyisocyanate precursor f. The viscosity of polyisocyanate precursor f obtained at 25° C. was 2700 mPa·s and the content of isocyanate was 21.7%. When 1H-NMR analysis was made, the molar ratio of isocyanurate group/allophanate group was 100/0.

Synthesis Example 7

(Synthesis of Polyisocyanate Precursor g)
The same apparatus as in Synthesis Example 1 was charged with HDI (1000 g) and 2-ethylhexanol (30 g) and an urethanization reaction was carried out at a reactor temperature of 80° C. with stirring for one hour. While keeping the reactor temperature at 80° C., 0.36 g of an n-butanol solution containing tetramethylammonium caprylate (an allophanatization and isocyanurate catalyst) in a solid content (10%) was added. After the resultant solution was stirred for further 3 hours, an aqueous solution (0.58 g) containing a phosphoric acid in a solid content of 85% was added to terminate the reaction. After the reaction solution was filtered, the unreacted HDI was removed in the same manner as in Synthesis Example 1 to obtain polyisocyanate precursor g. Polyisocyanate precursor g was obtained as a light yellow transparent liquid and the yield thereof was 300 g. The viscosity thereof at 25° C. was 450 mPa·s and the NCO content was 20.6%. When 1H-NMR analysis was made, the molar ratio of isocyanurate group/allophanate group was 75/25.

Synthesis Example 8

(Synthesis of Polyisocyanate Precursor h)
The interior atmosphere of a four-necked flask equipped with a stirrer, a thermometer and a cooling tube was replaced with nitrogen. The flask was charged with HDI (561.9 g) and isobutanol (38.1 g) and an urethanization reaction was carried out at 90° C. for 60 minutes while stirring. After the temperature of the reaction mixture was raised to 120° C., a mineral spirit solution (0.28 g) containing zirconium 2-ethyl hexanoate (an allophanatization catalyst) in a solid content of 20% was added. After the solution was stirred for further 60 minutes, an aqueous solution (0.097 g) containing phosphoric acid in a solid content of 85% was added to terminate the reaction. Thereafter, the reaction solution was filtered and then the unreacted HDI monomer was removed by a thin film distillation apparatus to obtain polyisocyanate precursor h. The viscosity of polyisocyanate precursor h obtained at 25° C. was 130 mPa·s and the NCO content was 18.8%. When 1H-NMR analysis was made, the molar ratio of isocyanurate group/allophanate group was 3/97.

Synthesis Example 9

(Synthesis of Polyisocyanate Precursor i)
Polyisocyanate precursor i was obtained in the same manner as in Synthesis Example 1 except that the monoalcohol was changed from 2-ethylhexanol to dodecanol. The viscosity of polyisocyanate precursor i obtained at 25° C. was 920 mPa·s and the NCO content was 22.1%. When 1H-NMR analysis was made, the molar ratio of isocyanurate group/allophanate group was 96/4.

Synthesis Example of Polycarbonate Diol

Synthesis Example 10

(Synthesis of Polycarbonate Diol A)
A 2 L separable flask equipped with a stirrer, a thermometer and a vacuum jacketed oldershaw having a reflux head on the top thereof was charged with 1,5-pentanediol (382 g), 1,6-hexanediol (433 g) and ethylene carbonate (650 g). After these substances were dissolved at 70° C. while stirring, lead acetate trihydrates (0.015 g) was added as a catalyst. The reaction mixture was heated in an oil bath set at 175° C. and reacted at an internal temperature of the flask of 140° C. and a degree of vacuum of 1.0 to 1.5 kPa for 12 hours while partially removing fractions from the reflux head at a reflux ratio of 4. Thereafter, the oldershaw was replaced with a single distillation apparatus. The reaction mixture was heated in an oil bath set at 180° C. and the internal temperature of the flask was decreased to 140 to 150° C. and the degree of vacuum to 0.5 kPa. In this manner, the diol and ethylene carbonate remaining in the separable flask were removed. Thereafter, the temperature of the oil bath was raised to 185° C. and a reaction was carried out for further 4 hours while removing the diol produced at an internal temperature of the flask of 160 to 165° C. Owing to the reaction, a viscous liquid at normal temperature was obtained. The OH value of polycarbonate diol A obtained was 56.1 (molecular weight: 2000) and the copolymer composition had 1,5-pentanediol/1,6-hexanediol=50/50 (molar ratio).

Synthesis Example 11

(Synthesis of Polycarbonate Diol B)
Polycarbonate diol B was synthesized in the same manner as in Synthesis Example 10 except that the oldershaw was replaced with a single distillation apparatus and thereafter, the predetermined temperature of the oil bath was raised to 185° C., the internal temperature of the flask was set at 160 to 165° C., and the time of removing the diol produced was set at 2.3 hours. The OH value of the reaction product obtained was 113.2 (molecular weight: 1000) and the copolymer composition had 1,5-pentanediol/1,6-hexanediol=50/50 (molar ratio).

Synthesis Example 12

(Synthesis of Polycarbonate Diol C)
Polycarbonate diol C was synthesized in the same manner as in Synthesis Example 10 except that the oldershaw was replaced with a single distillation apparatus and thereafter, the predetermined temperature of the oil bath was raised to 185° C., the internal temperature of the flask was set at 160 to 165° C., and the time of removing the diol produced was set at 1.5 hours. The OH value of the reaction product obtained was 224.4 (molecular weight: 500) and the copolymer composition had 1,5-pentanediol/1,6-hexanediol=50/50 (molar ratio).

Synthesis Example 13

(Synthesis of Polycarbonate Diol D)
Polycarbonate diol D was synthesized in the same manner as in Synthesis Example 10 except that 2-methyl-1,3-propanediol (330 g) and 1,4-butanediol (330 g) were used in place of 1,5-pentanediol (382 g) and 1,6-hexanediol (433 g). The OH value of the reaction product obtained was 56.1 (molecular weight: 2000) and the copolymer composition had 2-methyl-1,3-propanediol/1,4-butanediol=50/50 (molar ratio).

Synthesis Example 14

(Synthesis of Polycarbonate Diol E)
Polycarbonate diol E was synthesized in the same manner as in Synthesis Example 10 except that 2-methyl-1,3-propanediol (330 g) and 1,4-butanediol (330 g) were used in place of 1,5-pentanediol (382 g) and 1,6-hexanediol (433 g), the oldershaw was replaced with a single distillation apparatus and thereafter the predetermined temperature of the oil bath was raised to 185° C., the internal temperature of the flask was set at 160 to 165° C., and the time of removing the diol produced was set at 2.0 hours. The OH value of the reaction product obtained was 141.1 (molecular weight: 800) and the copolymer composition had 2-methyl-1,3-propanediol/1,4-butanediol=50/50 (molar ratio).

Synthesis Example 15

(Synthesis of Polycarbonate Diol F)
Polycarbonate diol F was synthesized in the same manner as in Synthesis Example 10 except that 1,4-butanediol (462 g) and 1,6-hexanediol (260 g) were used in place of 1,5-pentanediol (382 g) and 1,6-hexanediol (433 g). The OH value of the reaction product obtained was 56.1 (molecular weight: 2000) and the copolymer composition had 1,4-butanediol/1,6-hexanediol=70/30 (molar ratio).

Synthesis Example 16

(Synthesis of Polycarbonate Diol G)
Polycarbonate diol G was synthesized in the same manner as in Synthesis Example 10 except that 1,4-butane diol (594 g) and 1,6-hexane diol (87 g) were used in place of 1,5-pentanediol (382 g) and 1,6-hexanediol (433 g). The OH value of the reaction product obtained was 56.1 (molecular weight: 2000) and the copolymer composition had 1,4-butanediol/1,6-hexanediol=90/10 (molar ratio).

Synthesis Example 17

(Synthesis of Polycarbonate Diol H)
A 2 L-reactor equipped with a stirrer was charged with 1,6-hexane diol (520 g) and ethylene carbonate (410 g), and thereafter, with lead acetate trihydrate (0.009 g) as a catalyst, and connected to a rectifying column charged with regular packing. The reactor was soaked in an oil bath of 210° C. and a reaction was carried out at a reaction temperature of 170° C. for 20 hours, while partially removing a distillate. Thereafter, the reactor was directly connected to a condenser to decrease the temperature of the oil bath to 190° C. Thereafter, the pressure was gradually decreased and a reaction was further carried out for 8 hours. Owing to the reaction, aliphatic polycarbonate diol H (517 g) was obtained, which was white solid at normal temperature. The OH value of the reaction product obtained was 56.1 (molecular weight: 2000).

Synthesis Example of Polyisocyanate Composition

Example 1

Polyisocyanate precursor a of Synthesis Example 1 was used as a polyisocyanate precursor and polycarbonate diol A of Synthesis Example 10 was used as a copolymerized polycarbonate diol. These were mixed such that active hydrogen in a polycarbonate diol (1 equivalent) was contained relative to 5 equivalents of the isocyanate group (NCO/OH=5) in a polyisocyanate precursor and stirred at 100° C. The reaction was terminated at the time when the NCO content of the reaction solution reached the value shown in Table 1. The resultant reaction solution was diluted with n-butyl acetate until the solid content reached 70 mass % to obtain the polyisocyanate composition of Example 1. The NCO content (on the basis of solid content) and viscosity of the polyisocyanate composition obtained are as shown in Table 1.

Examples 2 to 17

A polyisocyanate precursor and polycarbonate diol were reacted in the same manner as in Example 1 except that the polyisocyanate precursor and polycarbonate diol shown in Table 1 were used. The NCO content (on the basis of solid content) and viscosity of the polyisocyanate compositions obtained are as shown in Table 1.

Example 18

The same apparatus as in Example 1 was charged with a polyisocyanate composition as described in Example 1 and n-butyl acetate as a solvent such that the concentration of a blocked polyisocyanate component became 70 mass %. The reaction solution was stirred under a nitrogen atmosphere at 60° C. To this, 3,5-dimethylpyrazole was added 1.05 times by mole as large as the NCO group of the polyisocyanate composition and stirred. The absence of absorption specific to an isocyanate group was confirmed in an infrared spectrum and a blocked polyisocyanate composition having an isocyanurate group was obtained. The effective NCO content and viscosity are as shown in Table 2.

Examples 19 to 31

Blocked polyisocyanate compositions were synthesized in the same manner as in Example 18 except that the polyisocyanate compositions shown in Table 2 were used. The effective NCO content and viscosity are as shown in Table 2.

Example 32

A blocked polyisocyanate composition was synthesized in the same manner as in Example 20 except that the polyisocyanate composition shown in Table 2 and methyl ethyl ketoxime as a blocking agent were used. The effective NCO content and viscosity are as shown in Table 2.

Example 33

A blocked polyisocyanate composition was synthesized in the same manner as in Example 20 except that the polyisocyanate composition shown in Table 2 and diisopropylamine as a blocking agent were used. The effective NCO content and viscosity are as shown in Table 2.

Comparative Example 1

The polyisocyanate composition of Comparative Example 1 was obtained in the same manner as in Example 1 except that polyisocyanate precursor b of Synthesis Example 2 was used as a polyisocyanate precursor and POLYLITE OD-X-2722 (molecular weight: 2000, manufactured by DIC) was used as a polyester diol. The NCO content and viscosity of the polyisocyanate composition obtained are as shown in Table 3.

Comparative Example 2

The polyisocyanate composition of Comparative Example 2 was obtained in the same manner as in Comparative Example 1 except that EXCENOL 2020 (molecular weight: 2000, manufactured by Asahi Glass Co., Ltd.) was used as the polyether diol. The NCO content and viscosity of the polyisocyanate composition obtained are as shown in Table 3.

Comparative Examples 3 to 6

The polyisocyanate compositions were obtained in the same manner as in Example 1 except that the polyisocyanate precursors and polycarbonate diols shown in Table 3 were used. The NCO contents and viscosities of the polyisocyanate compositions obtained are as shown in Table 3.

Comparative Examples 7 to 10

Blocked polyisocyanate compositions were obtained in the same manner as in Example 18 except that the polyisocyanate compositions shown in Table 4 were used. The NCO contents and viscosities of the blocked polyisocyanate compositions obtained are as shown in Table 4.

TABLE 1

| | Example | | | | | | | | |
|---|---|---|---|---|---|---|---|---|---|
| | 1 | 2 | 3 | 4 | 5 | 6 | 7 | 8 | 9 |
| Polyisocyanate composition No. | 1 | 2 | 3 | 4 | 5 | 6 | 7 | 8 | 9 |
| Polyisocyanate precursor | a | b | b | b | b | b | c | d | e |
| Isocyanurate/allophanate | 97/3 | 97/3 | 97/3 | 97/3 | 97/3 | 97/3 | 95/5 | 89/11 | 81/19 |
| Number of carbon atoms of monoalcohol | 4 | 8 | 8 | 8 | 8 | 8 | 8 | 4.8 | 8 |
| Polycarbonate diol | A | A | B | B | B | B | B | B | B |
| Number of carbon atoms of diol | 5,6 | 5,6 | 5,6 | 5,6 | 5,6 | 5,6 | 5,6 | 5,6 | 5,6 |
| Number average molecular weight | 2000 | 2000 | 1000 | 1000 | 1000 | 1000 | 1000 | 1000 | 1000 |
| NCO/OH | 5 | 5 | 3 | 5 | 15 | 30 | 5 | 5 | 5 |
| NCO content [wt %] (on the basis of solid content) | 8.8 | 8.7 | 8.1 | 11.9 | 18.3 | 20.5 | 11.8 | 11.8 | 11.7 |
| Viscosity [mPa · s/25° C.] | 6,700 | 7,000 | 14,200 | 1,500 | 260 | 180 | 1,450 | 1,200 | 1,100 |
| Drying property | ○ | ○ | ○ | ○ | ○ | ○ | ○ | ○ | ○ |
| Extensibility | ◎ | ◎ | ◎ | ◎ | ◎ | ○ | ◎ | ◎ | ◎ |
| Water resistance (haze) | ○ | ○ | ○ | ○ | ○ | ○ | ○ | ○ | ○ |
| Water resistance (strength retention rate) | ○ | ○ | ○ | ○ | ○ | ○ | ○ | ○ | ○ |
| Heat resistance | ○ | ○ | ○ | ○ | ○ | ○ | ○ | ○ | ○ |

TABLE 1-continued

| | | | | | | | | | |
|---|---|---|---|---|---|---|---|---|---|
| Staining resistance | ◉ | ◉ | ◉ | ◉ | ◉ | ◉ | ◉ | ○ | ○ |
| Surface smoothness | ◉ | ◉ | ◉ | ◉ | ◉ | ○ | ◉ | ◉ | ◉ |

| | | Example | | | | | | | |
|---|---|---|---|---|---|---|---|---|---|
| | | 10 | 11 | 12 | 13 | 14 | 15 | 16 | 17 |
| | Polyisocyanate composition No. | 10 | 11 | 12 | 13 | 14 | 15 | 16 | 17 |
| | Polyisocyanate precursor | i | b | b | b | b | b | b | b |
| | Isocyanurate/allophanate | 96/4 | 97/3 | 97/3 | 97/3 | 97/3 | 97/3 | 97/3 | 97/3 |
| | Number of carbon atoms of monoalcohol | 12 | 8 | 8 | 8 | 8 | 8 | 8 | 8 |
| | Polycarbonate diol | B | C | C | D | E | F | G | H |
| | Number of carbon atoms of diol | 5,6 | 5,6 | 5,6 | 4,4 (isomer) | 4,4 (isomer) | 4,6 | 4,6 | 6 |
| | Number average molecular weight | 1000 | 500 | 500 | 2000 | 800 | 2000 | 2000 | 2000 |
| | NCO/OH | 5 | 3 | 5 | 5 | 5 | 5 | 5 | 5 |
| | NCO content [wt %] (on the basis of solid content) | 11.6 | 10.6 | 14.5 | 8.7 | 12.9 | 8.7 | 8.7 | 8.7 |
| | Viscosity [mPa · s/25° C.] | 1,700 | 4,600 | 600 | 8,600 | 1,580 | 9,600 | 5,900 | 8,200 |
| | Drying property | Δ | ○ | ○ | ○ | ○ | ○ | ○ | ○ |
| | Extensibility | ○ | ◉ | ◉ | ◉ | ◉ | ◉ | ◉ | ○ |
| | Water resistance (haze) | ○ | ○ | ○ | ○ | ○ | ○ | ○ | ○ |
| | Water resistance (strength retention rate) | ○ | ○ | ○ | ○ | ○ | ○ | ○ | ○ |
| | Heat resistance | ○ | ○ | ○ | ○ | ○ | ○ | ○ | ○ |
| | Staining resistance | ○ | ◉ | ◉ | ◉ | ◉ | ◉ | ◉ | ◉ |
| | Surface smoothness | ○ | ◉ | ◉ | ○ | ○ | ○ | ○ | ○ |

TABLE 2

| | | Example | | | | | | | |
|---|---|---|---|---|---|---|---|---|---|
| | | 18 | 19 | 20 | 21 | 22 | 23 | 24 | 25 |
| | Blocked polyisocyanate composition No. | 1 | 2 | 3 | 4 | 5 | 6 | 7 | 8 |
| | Polyisocyanate composition No. | 1 | 3 | 4 | 6 | 7 | 8 | 9 | 10 |
| Blocking agent | 3,5-Dimethylpyrazole (molar ratio based on NCO group of polyisocyanate composition) | 1.05 | 1.05 | 1.05 | 1.05 | 1.05 | 1.05 | 1.05 | 1.05 |
| | Methyl ethyl ketoxime (molar ratio based on NCO group of polyisocyanate composition) | | | | | | | | |
| | Diisopropylamine (molar ratio based on NCO group of polyisocyanate composition) | | | | | | | | |
| | Effective NCO content [wt %] (on the basis of solid content) | 7.3 | 7.2 | 6.8 | 9.3 | 12.8 | 13.8 | 9.2 | 9.2 |
| | Viscosity [mPa · s/25° C.] | 18,600 | 46,000 | 8,800 | 470 | 8,500 | 8,100 | 7,400 | 7,200 |
| | Extensibility | ◉ | ◉ | ◉ | ◉ | ◉ | ◉ | ◉ | ◉ |
| | Water resistance (haze) | ○ | ○ | ○ | ○ | ○ | ○ | ○ | ○ |
| | Water resistance (strength retention rate) | ○ | ○ | ○ | ○ | ○ | ○ | ○ | ○ |
| | Heat resistance | ○ | ○ | ○ | ○ | ○ | ○ | ○ | ○ |
| | Staining resistance | ○ | ○ | ○ | ○ | ○ | ○ | ○ | ○ |
| | Surface smoothness | ◉ | ◉ | ◉ | ○ | ◉ | ◉ | ◉ | ◉ |

| | | Example | | | | | | | |
|---|---|---|---|---|---|---|---|---|---|
| | | 26 | 27 | 28 | 29 | 30 | 31 | 32 | 33 |
| | Blocked polyisocyanate composition No. | 9 | 10 | 11 | 12 | 13 | 14 | 15 | 16 |
| | Polyisocyanate composition No. | 11 | 12 | 13 | 14 | 15 | 16 | 4 | 4 |
| Blocking agent | 3,5-Dimethylpyrazole (molar ratio based on NCO group of polyisocyanate composition) | 1.05 | 1.05 | 1.05 | 1.05 | 1.05 | 1.05 | | |

TABLE 2-continued

|  | | | | | | | | |
|---|---|---|---|---|---|---|---|---|
| Methyl ethyl ketoxime (molar ratio based on NCO group of polyisocyanate composition) | | | | | | | 1.05 | |
| Diisopropylamine (molar ratio based on NCO group of polyisocyanate composition) | | | | | | | | 1.05 |
| Effective NCO content [wt %] (on the basis of solid content) | 9.2 | 8.5 | 10.8 | 7.2 | 9.9 | 7.2 | 7.3 | 7.2 |
| Viscosity [mPa · s/25° C.] | 2,500 | 19,500 | 5,100 | 30,100 | 20,900 | 18,800 | 6,100 | 8,600 |
| Extensibility | ◎ | ◎ | ◎ | ◎ | ◎ | ◎ | ◎ | ◎ |
| Water resistance (haze) | ○ | ○ | ○ | ○ | ○ | ○ | ○ | ○ |
| Water resistance (strength retention rate) | ○ | ○ | ○ | ○ | ○ | ○ | ○ | ○ |
| Heat resistance | ○ | ○ | ○ | ○ | ○ | ○ | ○ | ○ |
| Staining resistance | ○ | ○ | ○ | ○ | ○ | ○ | ○ | ○ |
| Surface smoothness | ◎ | ○ | ○ | ○ | ○ | ○ | ◎ | ◎ |

TABLE 3

| | Comparative Example | | | | | |
|---|---|---|---|---|---|---|
| | 1 | 2 | 3 | 4 | 5 | 6 |
| Polyisocyanate composition No. | 18 | 19 | 20 | 21 | 22 | 23 |
| Polyisocyanate precursor | b | b | f | g | h | b |
| Isocyanurate/allophanate | 97/3 | 97/3 | 100/0 | 75/25 | 3/97 | 97/3 |
| Number of carbon atoms of monoalcohol | 8 | 8 | — | 8 | 8 | 8 |
| Diol | Polyester diol | Polyether diol | B | B | B | — |
| Number of carbon atoms of diol | | | 5.6 | 5.6 | 5.6 | — |
| Number average molecular weight | 2000 | 2000 | 1000 | 1000 | 1000 | — |
| NCO/OH | 5 | 5 | 5 | 5 | 5 | — |
| NCO content [wt %] (on the basis of solid content) | 8.7 | 8.7 | 11.4 | 11.1 | 10.4 | 23.1 |
| Viscosity [mPa · s/25° C.] | 6,100 | 4,900 | 1,900 | 900 | 200 | — |
| Drying property | Δ | Δ | ○ | Δ | X | ○ |
| Extensibility | ◎ | ◎ | ○ | ◎ | ◎ | X |
| Water resistance (haze) | X | X | X | ○ | X | ○ |
| Water resistance (strength retention rate) | X | X | Δ | X | X | ○ |
| Heat resistance | X | X | ○ | X | X | ○ |
| Staining resistance | ○ | ○ | ○ | X | X | ○ |
| Surface smoothness | X | X | ◎ | ◎ | ◎ | X |

TABLE 4

| | | Comparative Example | | | |
|---|---|---|---|---|---|
| | | 7 | 8 | 9 | 10 |
| Blocked polyisocyanate composition No. | | 17 | 18 | 19 | 20 |
| Polyisocyanate composition No. | | 18 | 19 | 20 | 21 |
| Blocking agent | 3,5-Dimethylpyrazole (molar ratio based on NCO group of polyisocyanate composition) | 1.05 | 1.05 | 1.05 | 1.05 |
| Effective NCO content [wt %] (on the basis of solid content) | | 7.3 | 7.3 | 9.0 | 8.8 |
| Viscosity [mPa · s/25° C.] | | 37,000 | 28,600 | 11,200 | 5,800 |
| Extensibility | | ○ | ◎ | ○ | ◎ |
| Water resistance (haze) | | X | X | X | ○ |
| Water resistance (strength retention rate) | | X | X | Δ | X |
| Heat resistance | | ○ | X | ○ | X |
| Staining resistance | | ○ | X | ○ | X |
| Surface smoothness | | X | X | ◎ | ◎ |

The present application is based on Japanese Patent Application No. 2013-134440 filed Jun. 27, 2013 with the Japanese Patent Office, the content of which is incorporated herein by reference.

INDUSTRIAL APPLICABILITY

The present invention has industrial applicability as a curable composition, various surface treatment agent compositions, various elastomer compositions, a cross-linking agent and an additive such as a modifier.

The invention claimed is:

1. A polyisocyanate composition comprising a polyisocyanate, which is a reaction product of:
   a polyisocyanate precursor formed of a dimer or a multimer of hexamethylene diisocyanate; and
   a polycarbonate diol, which is obtained by copolymerizing a combination of 1,4-butanediol and 2-methyl-1,3-propanediol, and
   an alkylene carbonate,
   wherein
   the polyisocyanate precursor has an isocyanurate group and an allophanate group, and
   the isocyanurate group and the allophanate group are present in a molar ratio (the isocyanurate group/the allophanate group) of from 80:20 to 99:1.

2. The polyisocyanate composition according to claim 1, wherein the polyisocyanate precursor is derived from a monoalcohol having 4 to 9 carbon atoms.

3. A blocked polyisocyanate composition comprising a reaction product between the polyisocyanate composition according to claim 1 and a thermally dissociable blocking agent.

4. The blocked polyisocyanate composition according to claim 3, wherein the thermally dissociable blocking agent is at least one selected from the group consisting of an oxime compound, an acid amide compound, an amine compound, an active methylene compound and a pyrazole compound.

5. A method for producing a polyisocyanate composition comprising:
    subjecting hexamethylene diisocyanate to an isocyanurate reaction and an allophanatization reaction, to obtain a polyisocyanate precursor; and
    reacting the polyisocyanate precursor with a polycarbonate diol, which is obtained by copolymerization of a combination of 1,4-butanediol and 2-methyl-1,3-propanediol, with a carbonate compound, to obtain a polyisocyanate.

6. A method for producing a blocked polyisocyanate composition comprising:
    subjecting hexamethylene diisocyanate to an isocyanurate reaction and an allophanatization reaction, to obtain a polyisocyanate precursor; and
    reacting the polyisocyanate precursor, a polycarbonate diol, which is obtained by copolymerization of a combination of 1,4-butanediol and 2-methyl-1,3-propanediol, an alkylene carbonate, and a thermally dissociable blocking agent, to obtain a blocked polyisocyanate.

7. A blocked polyisocyanate composition comprising a reaction product between the polyisocyanate composition according to claim 2 and a thermally dissociable blocking agent.

8. The blocked polyisocyanate composition according to claim 7, wherein the thermally dissociable blocking agent is at least one selected from the group consisting of an oxime compound, an acid amide compound, an amine compound, an active methylene compound and a pyrazole compound.

9. A resin composition comprising:
    the polyisocyanate composition according to any one of claims 1 or 2 or the blocked polyisocyanate composition according to any one of claims 3, 4, 7, or 8; and an active hydrogen compound.

10. A hardened material obtained by hardening the resin composition according to claim 9.

* * * * *

UNITED STATES PATENT AND TRADEMARK OFFICE
CERTIFICATE OF CORRECTION

PATENT NO. : 10,301,416 B2
APPLICATION NO. : 14/900279
DATED : May 28, 2019
INVENTOR(S) : T. Fukuchi et al.

Page 1 of 1

It is certified that error appears in the above-identified patent and that said Letters Patent is hereby corrected as shown below:

On the Title Page

On page 2, References Cited, Foreign Patent Documents, please change "NO 2012-141250 10/2012" to --WO 2012-141250 10/2012--.

Signed and Sealed this
Twenty-sixth Day of November, 2019

Andrei Iancu
*Director of the United States Patent and Trademark Office*